Sept. 3, 1946.    C. F. COAKE    2,407,140
ELECTRIC MICROGAUGE SYSTEM
Filed Aug. 2, 1944    2 Sheets-Sheet 1
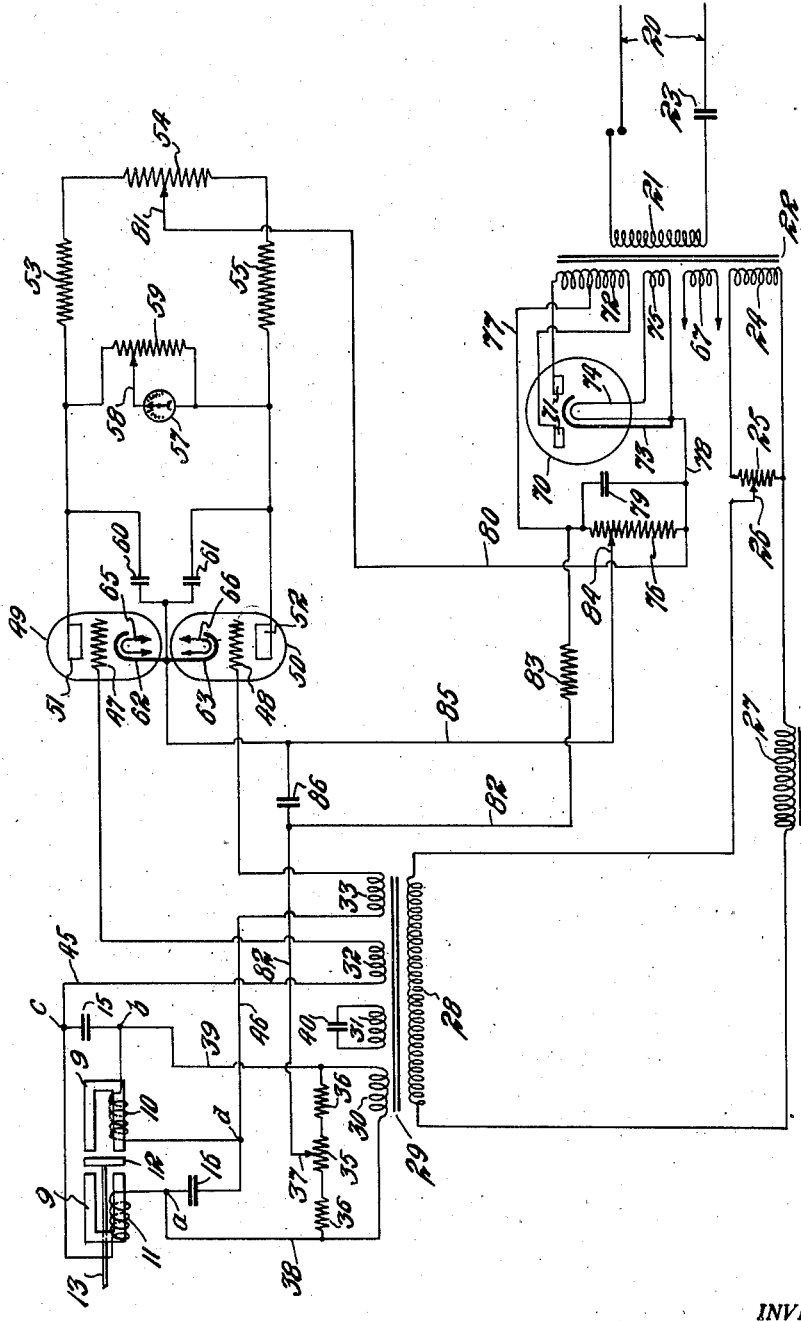
INVENTOR.
CHARLES F. COAKE
BY
ATTORNEY Sept. 3, 1946.  C. F. COAKE  2,407,140
ELECTRIC MICROGAUGE SYSTEM
Filed Aug. 2, 1944  2 Sheets-Sheet 2

INVENTOR.
CHARLES F. COAKE
BY
ATTORNEY

Patented Sept. 3, 1946

2,407,140

UNITED STATES PATENT OFFICE 2,407,140

ELECTRIC MICROGAUGE SYSTEM

Charles F. Coake, Indianapolis, Ind., assignor to Senn Corporation, New Augusta, Ind., a corporation of Indiana Application August 2, 1944, Serial No. 547,766

20 Claims. (Cl. 177—351)

This invention relates to electric micro-gauges of the type including a variable impedance device the impedance of which is varied in accordance with the quantity to be measured, and more particularly to a novel and improved system for actuating an instrument in response to such changes in impedance.

An object of the invention is to provide a system of the above type having novel and improved operating characteristics.

Another object is to provide a system which operates with extreme accuracy and dependability.

Another object is to provide a system of the above type which is not affected by minor changes in the voltage or in the wave form of the energizing source.

Another object is to provide a system of the above type which may be readily adjusted to conform to various operating conditions.

Various other objects and advantages will be apparent as the nature of the invention is more fully disclosed.

In accordance with the present invention the variations in impedance of the variable impedance device are caused to effect changes in phase in an output circuit which are functions of the variations in the quantity being measured. These phase changes are utilized to control the response of a measuring instrument.

More specifically, the variable impedance device is connected in a Wheatstone bridge circuit which includes a pair of parallel branches, each containing a condenser and an inductance in series, with the elements reversed in the two branches. A source of alternating voltage is connected across diagonal corners of the bridge and an output circuit is connected across the other diagonal corners. A measuring stylus is connected to vary in an inverse sense the impedances of at least one pair of diagonally opposite elements in a manner to change the phase of the voltage in the output circuit. Suitable means are provided for measuring this phase shift. In one embodiment this voltage of variable phase is superimposed on another voltage of fixed phase to obtain unbalanced voltage conditions on the two sides of the output circuit which are suited to measurement by means of a full wave rectifier circuit having a millivoltmeter connected across suitable points in its output side.

Although the novel features which are believed to be characteristic of this invention are pointed out more fully in the claims, the invention will be better understood by referring to the following description taken in connection with the accompanying drawings in which specific embodiments have been set forth for purposes of illustration.

In the drawings:

Fig. 1 is a schematic diagram of a circuit embodying the invention;

Figure 2:
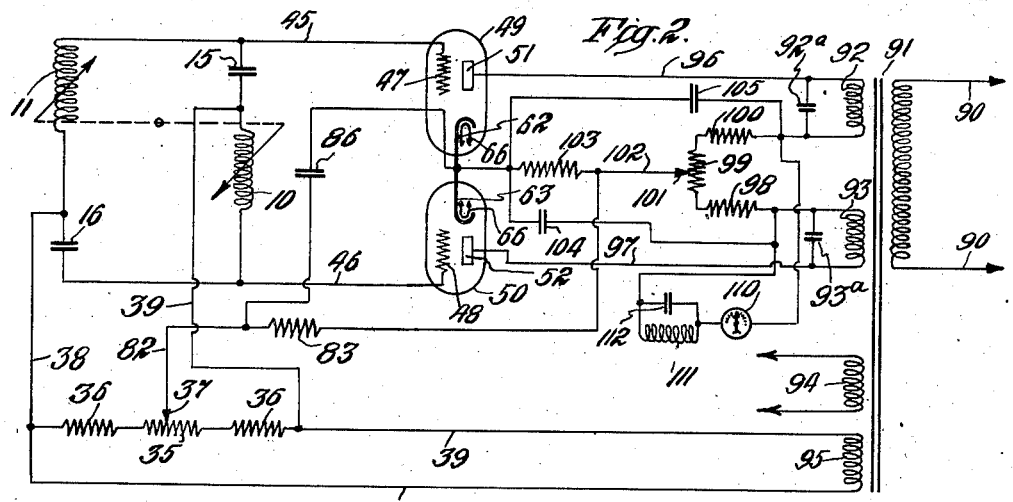
Fig. 2 is a schematic diagram illustrating another embodiment of the invention wherein the fixed phase voltages are impressed in the output circuit of the push-pull stage.

Although specific terms have been used herein for convenience in referring to the various details of the invention, it is to be understood that these terms are to be given an interpretation commensurate with the state of the art.

Referring first to Fig. 1, the variable impedance elements are shown as comprising a pair of coils 10, 11 associated with a magnetic circuit including fixed cores 9 and an armature 12 mounted for movement to vary the reluctance of the magnetic circuits in an inverse manner for effecting corresponding changes in the impedances of the coils. The armature 12 is connected to be actuated by a stylus 13 which constitutes the measuring element of the gauge. The construction of a suitable unit including the parts 9 to 13 is set forth in detail in my copending application Ser. No. 548,281, filed August 5, 1944, and only so much thereof is shown herein as is necessary for an understanding of the present invention.

In accordance with the present invention, the coils 10 and 11 are connected respectively in series with condensers 15 and 16 to form a Wheatstone bridge circuit having two parallel branches one of which includes coil 10 and condenser 15 in series and the other of which includes coil 11 and condenser 16 in series, with the elements reversed in the two branches so that the two coils are in diagonally opposite legs and the two condensers are in the other diagonally opposite legs.

An alternating voltage of a fixed magnitude and wave form is supplied across opposite corners of the Wheatstone bridge by a circuit including an alternating current line 20 supplying the primary 21 of a voltage regulating transformer 22 of standard construction and including a series condenser 23 which is designed to increase the current flow through the primary 21 to a value such that saturation is obtained. The output voltage of the transformer is accordingly independent of minor variations in the supply voltage.

The transformer 22 includes a secondary 24 which is connected across a potentiometer 25 having an adjustable tap 26. The variable portion of the potentiometer 25 is connected through a series choke 27 to the primary 28 of a transformer 29 having a plurality of secondaries 30 to 33. The secondary 30 is connected across a potentiometer 35 in series with fixed resistances 36. The potentiometer 35 is provided with an adjustable tap 37 which constitutes a zero adjustment, as will be described. The secondary 30 is also connected by lines 38 and 39 to opposite corners $a$ and $b$ of the Wheatstone bridge between the coil 11 and condenser 16 and between the coil 10 and condenser 15, respectively.

A condenser 40 is connected across the secondary 31 and is normally designed to tune the circuit including the secondary 31 to the frequency of the applied alternating current. This tuned circuit carries a current which is large with respect to the current in the primary 28 and thus has a dominating influence on the wave form of the current in the secondary 30. Since the oscillations in the tuned circuit 31 and 40 are predominantly sine wave in form, this same wave form appears in the secondary 30 regardless of variations in wave form of the applied voltage. If the capacity predominates in the tuned circuit 31 and 40, it may not be necessary to tune the circuit to resonance. The choke 27 is an isolating device to lessen the coupling between windings 28 and 24.

The output of the Wheatstone bridge circuit includes a line 45 which is connected to the point $c$ between the condenser 15 and coil 11 and the line 46 which is connected to the point $d$ between the condenser 16 and the coil 10. The lines 45 and 46 are connected through the secondaries 32 and 33 respectively to grids 47 and 48 of space discharge devices 49 and 50 which may be included in a single envelope if desired.

Anodes 51 and 52 of the space discharge devices 49 and 50 are connected in an output circuit including resistors 53, 54 and 55 connected in series. A potentiometer 59 is connected between the anodes 51 and 52 and a measuring instrument, such as a millivoltmeter 57, is connected between one end and a variable tap 58 of the potentiometer 59. The usual by-pass condensers 60 and 61 are connected between the anodes 51 and 52 and cathodes 62 and 63 respectively of the space discharge devices 49 and 50.

The cathodes 62 and 63 are provided with heaters 65 and 66 which are supplied from a secondary 67 of the transformer 22. The anode and grid biasing potentials are supplied through a rectifying system including a rectifying tube 70 having anodes 71 connected across a secondary 72 of the transformer 22 and having a cathode 73 provided with a heater 74 which is energized from a secondary 75 of the transformer 22. A voltage divider resistance 76 is connected by a line 77 to the midpoint of the secondary 72 and by a line 78 to the cathode 73. The usual by-pass condenser 79 is connected across the resistor 76. The positive end of the resistor 76 is connected by a line 80 to an adjustable tap 81 on the resistor 54. The negative end of the resistor 76 is connected by a line 82 through a resistor 83 to the adjustable tap 37 on the resistor 35. A tap 84 on the resistor 76 is connected by a line 85 to the cathodes 62 and 63. A by-pass condenser 86 is connected between the lines 82 and 85.

In the operation of this system, a standard alternating voltage is supplied across the Wheatstone bridge circuit from the line 20 through the transformer 22 and the secondary 30 of the transformer 29. A substantially constant voltage is obtained by means of the voltage regulating characteristics of the transformer 22 and a correct wave form is maintained by means of the tuned circuit 31 and 40 operating in conjunction with isolating choke 27. The tap 26 of the potentiometer 25 permits adjustments to be made so that a predetermined voltage may be applied to the Wheatstone bridge of all units regardless of differences in the source.

The coils 10 and 11 and condensers 15 and 16 are selected so that they are normally of equal impedance at the frequency of operation. Under these conditions the lines 45 and 46 are at the same potential with respect to line 82 except of opposite sign, voltage at point $c$ being 90° out of phase with voltage at point 47 supplied by winding 32 and voltage at point $d$ being 90° out of phase with voltage at point 48 supplied by winding 33. This condition exists when the armature is centrally located. As the grid circuits of the rectifier tubes 49 and 50 are connected in push-pull to the bridge output lines 45 and 46 and the return line 82, the grids are normally at the same resultant potential.

If now the stylus 13 is displaced, the impedance of the coil 10 is increased and the impedance of the coil 11 is decreased or vice versa, depending upon the direction of displacement. Under these conditions, the impedances of the coils 10 and 11 and of the condensers 15 and 16 are no longer in balance and the voltages in the lines 45 and 46 become displaced in phase in opposite directions, one voltage being caused to lead and the other to lag by equal amounts with little change in the magnitude of the voltage. The phase shift of the voltage between point $a$ through coil 11 to point $c$ is essentially 90° lag. The phase shift of the voltage between point $a$ through condenser 16 to point $d$ is essentially 90° lead. Variations from the above conditions of 90° lag to 90° lead is obtained by movements of the armature by virtue of impedance variation of the two coils 10 and 11 which in turn is related to the movement of the stylus 13.

In order to measure the amount of this phase shift, an alternating voltage of fixed phase is supplied to lines 45 and 46 through secondaries 32 and 33 respectively. This fixed phase corresponds to the phase of the voltage across the lines 38 and 39. These voltages of fixed phase when combined with a leading voltage in the line 45 and a lagging voltage in the line 46 or vice versa produce a voltage differential on the two grids 47 and 48 respectively which is a function of the amount of phase shift across the lines 45 and 46. This voltage differential causes different plate currents to flow through the corresponding tubes and through the resistors 53 and 55, thus changing the potentials of the two plates and producing a voltage differential across the potentiometer 59 which is measured by the voltmeter 57. The reading of the voltmeter 57 thus constitutes a measure of the movement of the stylus 13.

The tap 58 provides a sensitivity adjustment which may be varied in accordance with the order of the quantities being measured. The tap 81 on the resistor 54 provides an adjustment for balancing the tubes and resistors. The tap 37 on the resistor 35 may be varied to obtain an initial zero balance while the fixed resistors 36 limit the range of adjustment so as to avoid overcompensation. The tap 84 is adjusted to apply a grid bias suited to cause the tubes 49 and 50 to operate below the straight portion of their characteristic curves.

It will be noted that the above described system is responsive to phase changes and is accordingly insensitive to minor variations in operating conditions of the various space discharge devices or to minor changes in voltage of the supply line such as those which may not be entirely eliminated by the voltage regulating transformer 22.

The system may be used to measure micro-variations to which the stylus 13 is responsive as, for example, variations in hydraulic or air pressures which may be measured by the displacement of diaphragms, micro movements of temperature regulators or thermometers, the reading of balances, a strain gauge or a micrometer or the like in which measurements of millionths of an inch may be made. The arrangement may be made to produce a 90° or greater total phase shift between extremes of .01 inch of movement of the stylus 13.

It is to be understood that various circuits may be used to measure the phase displacement across the lines 45 and 46. A modified circuit for this purpose is shown in Fig. 2 in which the voltage of fixed phase is impressed on the output circuit of the tubes 49 and 50 instead of on the input circuit as shown in Fig. 1. The bridge elements and the input and output circuits to the bridge in Fig. 2 are similar to those above described and have been given the same reference characters. In Fig. 2, however, power is supplied from an A.-C. line 90 to a transformer 91 having secondaries 92 to 95. The secondary 95 is connected to the input lines 38 and 39 to supply voltage to the input circuit of the bridge. The secondary 94 is connected to supply heating current to the filament 66 of the tubes 49 and 50. The output lines 45 and 46 are connected directly to the grids 47 and 48 of the tubes 49 and 50. Otherwise the supply circuit to the bridge and to the tubes 49 and 50 is similar to that above described.

In Fig. 2 plates 51 and 52 are connected by lines 96 and 97 to secondaries 92 and 93 respectively which are connected in series through resistances 98, 99 and 100. The resistance 99 is provided with an adjustable tap 101 which is connected by a line 102 through a resistance 103 to the cathodes 62 and 63. Resistances 98, 99 and 100 are by-passed to the cathodes by condensers 104 and 105. A millivoltmeter 110 is connected in series with a filter circuit including an inductance 111 and condenser 112 across the resistors 98, 99 and 100. The windings 92 and 93 are so connected with respect to each other that potentials of opposite sign are applied to the anodes 51 and 52. Grid 47 and anode 51 and grid 48 and anode 52 are 90° out of phase when the armature 12 is centrally located, thereby causing each tube to draw equal anode current and producing zero voltage across the meter 110. A voltage regulating transformer similar to the transformer 22 of Fig. 1 may be connected between the power line 90 and the transformer 91 if desired and the circuit may include means, such as the choke 27 of Fig. 1 and tuning condensers 92a and 93a across the secondaries 92 and 93 to maintain a sine wave form.

In the operation of this system, the voltages supplied across the lines 45 and 46 to the grids 47 and 48 vary in phase in accordance with the changes in impedance of the coils 10 and 11. The anode potentials on the plates 51 and 52 are of fixed phase corresponding to the phase of the supply line 90. Consequently, the space current passed by the tubes 49 and 50 varies in accordance with the phase displacement between the grid potentials and the anode potentials. When these potentials are 90° displaced between grid and plate of each triode balanced conditions exist and no potential difference is developed across the meter 110. However, when these potentials or voltages become displaced other than 90° due to variation of phase between grid and plate of each triode such as 85° between 47 and 51 and 95° between 48 and 52, a potential difference exists due to the unequal current flowing through the resistors 98 and 100 and the meter 110 responds accordingly. The adjustable tap 101 provides means for adjusting the circuit to balance the tubes and resistors. The filter circuit 111 and 112 prevents the alternating current from passing through the millivoltmeter 110 and makes the latter responsive only to the voltage differential across the resistors 98 and 100. Condenser 112 could be eliminated if inductance 111 is sufficient to keep A. C. voltage from meter 110.

In the above described embodiments the coils 10 and 11 have been described as of variable impedance. It is to be understood, however, that the coils 10 and 11 may be designed to have a constant impedance and the impedance of the condensers 15 and 16 may be varied as indicated in the bridge circuit of Fig. 3. In this case the capacity of the condensers 15 and 16 is indicated as variable in unison, but in an inverse sense in response to the movement of the stylus. The operation of this bridge is otherwise similar to that above described.

Figures 3, 4:
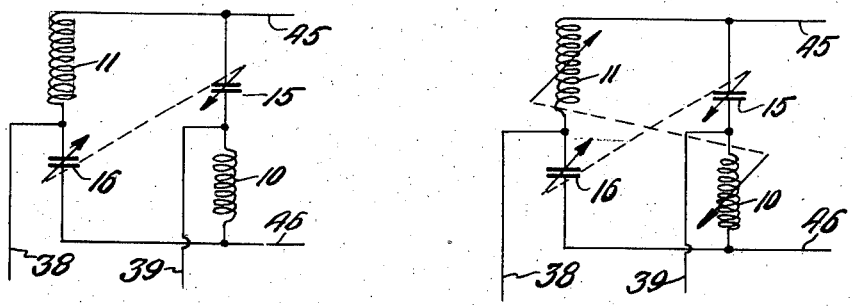
Fig. 3 is a schematic diagram of a bridge circuit wherein the condensers are varied while the inductances remain constant.
Fig. 4 is a schematic diagram of a bridge circuit wherein both the condensers and the inductances are varied.

Another embodiment of the invention is illustrated in Fig. 4 in which both the coils 10 and 11 and the condensers 15 and 16 are shown as variable. In this embodiment the impedances of the coils 10 and 11 are varied in unison but in an opposite sense and the capacities of the condensers 15 and 16 are likewise varied in unison but in opposite sense in response to movement of the stylus. The operation is similar to that above described except that a greater phase shift is produced than in the case where only the coils or the condensers are varied.

Figure 5:
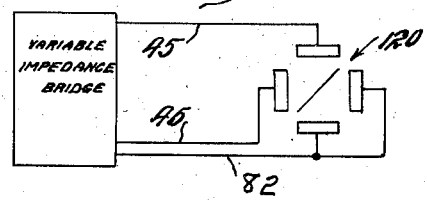
Fig. 5 is a partial schematic diagram showing the use of a cathode ray oscillograph for measuring the phase shift.

The embodiment shown in Fig. 5 is similar in general to the embodiment of Fig. 1 so far as the bridge and input circuits are concerned. In this embodiment, however, the output lines 45 and 46 and the return line 82 which constitutes the output circuit of the bridge are connected to a cathode ray oscillograph 120 which is designed to indicate phase variations in the lines 45 and 46 with respect to line 82.

Figure 6:
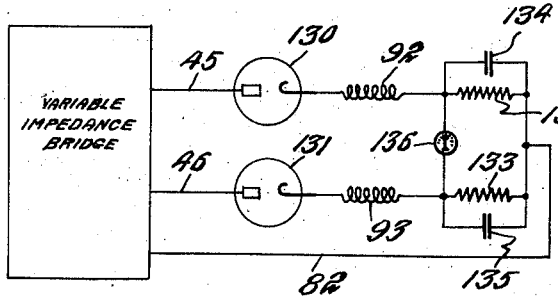
Fig. 6 is a partial schematic diagram showing the use of diode rectifiers for this purpose.

Fig. 6 illustrates the use of diode full wave rectifiers in the output circuit from the variable impedance bridge. In this figure the bridge and input circuits are similar to those described above. Lines 45 and 46, constituting the output circuit of the bridge, are connected to diode rectifiers 130 and 131 respectively which, in turn, are connected through the secondaries 92 and 93 (of Fig. 2) and resistors 132 and 133 to the return lead 82 so as to make the cathodes of tubes 130 and 131 180° out of phase. By-pass condensers 134 and 135 are shown connected across the resistors 132 and 133. A millivoltmeter 136 is likewise connected across the rectifier side of the two resistors.

This embodiment operates in a manner similar to Fig. 2, the rectifiers 130 and 131 passing a current which is determined by the phase of the voltage supplied by the lines 45 and 46 with respect to the voltage supplied by the secondaries 92 and 93. When the voltages are such as to make the phase angle between the cathode and anode of each rectifier equal to 90°, equal currents are passed by the two rectifiers and flow through the two resistors 132 and 133. Hence, no voltage drop exists across the meter 136. When the above mentioned voltages are other than 90° out of phase, different currents are passed by the two rectifiers and a voltage differential exists across the meter 136 which is a measure of the phase displacement.

Although a specific embodiment of the invention has been shown herein for purposes of illustration, it is to be understood that the invention is capable of various uses as will be apparent to a person skilled in the art. The invention is only to be limited in accordance with the scope of the following claims.

What is claimed is:

1. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, means supplying a given alternating voltage across opposite corners of said bridge and an output circuit connected across other opposite corners of said bridge, means oppositely varying the reactance of a pair of like elements of said bridge in accordance with the quantity being measured to produce a phase shift in said output circuit which is a function of said variation, and means measuring said phase shift.

2. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, means supplying a given alternating voltage across opposite corners of said bridge and an output circuit connected across other opposite corners of said bridge, means oppositely varying the reactance of a pair of like elements of said bridge in accordance with the quantity being measured to produce a phase shift in said output circuit which is a function of said variation, means superimposing a voltage of fixed phase on said output circuit to be combined with said voltage of variable phase to produce a voltage unbalance across said output circuit and means measuring said voltage unbalance.

3. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, means supplying a given alternating voltage across opposite corners of said bridge and an output circuit connected across other opposite corners of said bridge, means oppositely varying the reactance of a pair of like elements of said bridge in accordance with the quantity being measured to produce a phase shift in said output circuit which is a function of said variation, means superimposing a voltage of fixed phase on said output circuit to be combined with said voltage of variable phase to produce a voltage unbalance across said output circuit, a pair of space discharge devices, means connecting said output circuit to the inputs of said devices in push-pull relationship to produce correspondingly unbalanced space currents therein and means measuring said unbalance in space currents.

4. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, means supplying a given alternating voltage across opposite corners of said bridge and an output circuit connected across other opposite corners of said bridge, means oppositely varying the reactance of a pair of like elements of said bridge in accordance with the quantity being measured to produce a phase shift in said output circuit which is a function of said variation, means superimposing a voltage of fixed phase on said output circuit to be combined with said voltage of variable phase to produce a voltage unbalance across said output circuit, a pair of space discharge devices, means connecting said output circuit to the inputs of said devices in push-pull relationship to produce correspondingly unbalanced space currents therein, anode circuits connected to said devices having means varying the anode voltages in accordance with variations in space current and a measuring circuit connected between said anode circuits to respond to the unbalance in anode voltages.

5. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, means supplying a given alternating voltage across opposite corners of said bridge and an output circuit connected across other opposite corners of said bridge, means oppositely varying the reactance of a pair of like elements of said bridge in accordance with the quantity being measured to produce a phase shift in said output circuit which is a function of said variation, means combining said voltage with another voltage having a phase relationship suited to produce a voltage unbalance in said output circuit, and means measuring said voltage unbalance.

6. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit including lines connected across opposite corners of said bridge to supply an alternating voltage thereto, an output circuit including lines connected across the other opposite corners of said bridge and a common return line, means connecting said common return line to a neutral point on said input circuit, means oppositely varying the reactance of a pair of like elements of said bridge in accordance with the quantity being measured to produce a phase shift in said output circuit which is a function of said variation, means supplying another voltage to said output circuit suited to be combined with said variable phase voltage to cause an unbalance in the voltage on said first output lines with respect to said common return line, means measuring said unbalance, and means adjusting said neutral point to obtain desired zero reading conditions in said measuring means.

7. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit including lines connected across opposite corners of said bridge to supply an alternating voltage thereto, an output circuit including lines connected across the other opposite corners of said bridge and a common return line, means connecting said common return line to a neutral point on said input circuit, means oppositely varying the reactance of a pair of like elements of said bridge in accordance with the quantity being measured to produce a phase shift in said output circuit which is a function of said variation, means supplying another voltage to said output circuit suited to be combined with said variable phase voltage to cause an unbalance in the voltage on said first output lines with respect to said common return line, a pair of space discharge tubes having input circuits connected in push-pull to said output lines, and having output circuits carrying the space current of the respective devices, and means comparing said space currents.

8. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit including lines connected across opposite corners of said bridge to supply an alternating voltage thereto, an output circuit including lines connected across the other opposite corners of said bridge and a common return line, means connecting said common return line to a neutral point on said input circuit, means oppositely varying the reactance of a pair of like elements of said bridge in accordance with the quantity being measured to produce a phase shift in said output circuit which is a function of said variation, means supplying another voltage to said output circuit suited to be combined with said variable phase voltage to cause an unbalance in the voltage on said first output lines with respect to said common return line, a pair of space discharge tubes having input circuits connected in push-pull to said output lines, and having output circuits carrying the space current of the respective devices, means comparing said space currents, and means adjusting said neutral point to obtain desired zero reading conditions in said comparing means.

9. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit including lines connected across opposite corners of said bridge to supply an alternating voltage thereto, an output circuit including lines connected across the other opposite corners of said bridge and a common return line, means connecting said common return line to a neutral point on said input circuit, means oppositely varying the reactance of a pair of like elements of said bridge in accordance with the quantity being measured to produce a phase shift in said output circuit which is a function of said variation, means supplying another voltage to said output circuit suited to be combined with said variable phase voltage to cause an unbalance in the voltage on said first output lines with respect to said common return line, a pair of space discharge tubes having input circuits connected in push-pull to said output lines, and having output circuits carrying the space current of the respective devices, means comparing said space currents, and means adjusting the response characteristics of said comparing means.

10. An electric measuring system as set forth in claim 1 in which said alternating voltage supply means comprises a transformer having a primary supplied with alternating voltage and a pair of secondaries, one of said secondaries being connected across said first corners to supply voltage to said bridge, and a condenser connected across the other of said secondaries to form a tuned oscillating circuit adapted to carry a current suited to control the wave form of the voltage in the first secondary.

11. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, means combining said fixed phase voltage with said variable phase voltage to produce a voltage unbalance in said output circuit lines, and measuring means responsive to said voltage unbalance.

12. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge, a source of supply voltage including a transformer having a primary and a plurality of secondaries, means connecting one of said secondaries to supply voltage to said input circuit, means connecting a pair of other secondaries to supply voltages of fixed phase to the respective output circuit lines, means oppositely varying the reactance of a pair of like elements of said bridge in accordance with the quantity being measured to produce a phase shift in said output circuit which is a function of said variations, means combining said fixed phase voltage with said variable phase voltage to produce a voltage unbalance in said output circuit lines, and measuring means responsive to said voltage unbalance.

13. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge and a common return line connected to a neutral point of said input circuit, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, a pair of space discharge devices having input circuits connected in push-pull to said output circuit lines to develop space currents which are normally balanced but become unbalanced in response to said variations in phase in said bridge output, and measuring means responsive to said unbalance in space currents.

14. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, means combining said fixed phase voltage with said variable phase voltage to produce a voltage unbalance in said output circuit lines, measuring means responsive to said voltage unbalance, and a condenser connected across another of said secondaries to form a closed circuit tuned to the frequency of the supply voltage and adapted to carry a current for controlling the wave form applied to the bridge input circuit.

15. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, means combining said fixed phase voltage with said variable phase voltage to produce a voltage unbalance in said output circuit lines, measuring means responsive to said voltage unbalance, a condenser connected across another of said secondaries to form a closed circuit tuned to the frequency of the supply voltage and adapted to carry a current for controlling the wave form applied to the bridge input circuit, and supply lines connected to said primary and a choke in said last lines to prevent transference thereto of oscillations from said tuned secondary.

16. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, means combining said fixed phase voltage with said variable phase voltage to produce a voltage unbalance in said output circuit lines, measuring means responsive to said voltage unbalance, a condenser connected across another of said secondaries to form a closed circuit tuned to the frequency of the supply voltage and adapted to carry a current for controlling the wave form applied to the bridge input circuit, supply lines connected to said primary and a choke in said last lines to prevent transference thereto of oscillations from said tuned secondary, and a voltage regulating transformer supplying said last lines.

17. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit including lines connected across opposite corners of said bridge to supply an alternating voltage thereto, an output circuit including lines connected across the other opposite corners of said bridge and a common return line, means connecting said common return line to a neutral point on said input circuit comprising a resistor connected across said input circuit and having an adjustable tap connected to said return line, means oppositely varying the reactance of a pair of like elements of said bridge in accordance with the quantity being measured to produce a phase shift in said output circuit which is a function of said variation, means supplying another voltage to said output circuit suited to be combined with said variable phase voltage to cause an unbalance in the voltage on said first output lines with respect to said common return line, and means measuring said unbalance.

18. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit including lines connected across opposite corners of said bridge to supply an alternating voltage thereto, an output circuit including lines connected across the other opposite corners of said bridge and a common return line, means connecting said common return line to a neutral point on said input circuit comprising a variable resistor and a pair of fixed resistors connected in series across said input circuit, said variable resistor having a tap connected to said return line, means oppositely varying the reactance of a pair of like elements of said bridge in accordance with the quantity being measured to produce a phase shift in said output circuit which is a function of said variation, means supplying another voltage to said output circuit suited to be combined with said variable phase voltage to cause an unbalance in the voltage on said first output lines with respect to said common return line, and means measuring said unbalance.

19. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge and a common return line connected to a neutral point of said input circuit, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, a pair of space discharge devices having input circuits connected in push-pull to said output circuit lines to develop space currents which are normally balanced but become unbalanced in response to said variations in phase in said bridge output, space current circuits for said devices including resistors to cause a variation in anode voltage corresponding to variations in space current, and a center reading milliammeter connected between said anodes.

20. An electric measuring system comprising a Wheatstone bridge circuit including a pair of parallel series resonant branches each having an inductive leg and a capacitive leg connected in series with the elements of the two branches reversed in order so that like elements appear in diagonally opposite legs, an input circuit connected across opposite corners of said bridge, an output circuit including lines connected across the other opposite corners of said bridge and a common return line connected to a neutral point of said input circuit, a source of supply voltage including a transformer having a primary and a plurality of secondaries, means connecting one of said secondaries to supply voltage to said input circuit, means connecting other of said secondaries to supply a voltage of fixed phase to said output circuit, means oppositely varying the reactance of a pair of like elements of said bridge in accordance with the quantity being measured to produce a phase shift in said output circuit which is a function of said variations, a pair of space discharge devices having input circuits connected in push-pull to said output circuit lines to develop space currents which are normally balanced but become unbalanced in response to said variations in phase in said bridge output, space current circuits for said devices including resistors to cause a variation in anode voltage corresponding to variations in space current, a center reading milliammeter connected between said anodes, and a variable resistor connected in shunt with said milliammeter for adjustment of the sensitivity thereof.

CHARLES F. COAKE.